US010861449B2

(12) United States Patent
Koyama et al.

(10) Patent No.: US 10,861,449 B2
(45) Date of Patent: Dec. 8, 2020

(54) INFORMATION PROCESSING DEVICE AND INFORMATION PROCESSING METHOD

(71) Applicant: SONY CORPORATION, Tokyo (JP)

(72) Inventors: Yuichiro Koyama, Tokyo (JP); Kazuya Tateishi, Tokyo (JP)

(73) Assignee: SONY CORPORATION, Tokyo (JP)

(*) Notice: Subject to any disclaimer, the term of this patent is extended or adjusted under 35 U.S.C. 154(b) by 87 days.

(21) Appl. No.: 15/570,859

(22) PCT Filed: Mar. 31, 2016

(86) PCT No.: PCT/JP2016/060792
§ 371 (c)(1),
(2) Date: Oct. 31, 2017

(87) PCT Pub. No.: WO2016/185809
PCT Pub. Date: Nov. 24, 2016

(65) Prior Publication Data
US 2018/0137860 A1 May 17, 2018

(30) Foreign Application Priority Data
May 19, 2015 (JP) .................................. 2015-101845

(51) Int. Cl.
*G10L 15/22* (2006.01)
*G10L 15/00* (2013.01)
(Continued)

(52) U.S. Cl.
CPC ............. *G10L 15/22* (2013.01); *G06F 3/167* (2013.01); *G10L 15/00* (2013.01); *G10L 15/10* (2013.01);
(Continued)

(58) Field of Classification Search
None
See application file for complete search history.

(56) References Cited
U.S. PATENT DOCUMENTS 9,196,239 B1* 11/2015 Taylor .................... G06F 3/017
9,526,127 B1* 12/2016 Taubman ................ G10L 15/22
(Continued)

FOREIGN PATENT DOCUMENTS

CN           104428825 A     3/2015
EP             3043348 A1    7/2016
(Continued)

OTHER PUBLICATIONS

Extended European Search Report of EP Patent Application No. 16796203.4, dated Sep. 13, 2018, 07 pages.
(Continued)

Primary Examiner — Jonathan C Kim
(74) Attorney, Agent, or Firm — Chip Law Group

(57) ABSTRACT

[Object] To provide an information processing device, an information processing method, and a program, which are capable of causing a device which is desirable to the user among a plurality of devices to give a response.
[Solution] An information processing device including: an input unit configured to obtain information related to a voice of a user and device information of each of a plurality of devices; and a selecting unit configured to select a device from the plurality of devices on the basis of an aspect specified by at least one of the information related to the voice and the device information obtained by the input unit and the device information.

20 Claims, 18 Drawing Sheets

(51) Int. Cl.
*G10L 15/10* (2006.01)
*H04R 3/12* (2006.01)
*G06F 3/16* (2006.01)
*G10L 15/26* (2006.01)
*G10L 15/28* (2013.01)

(52) U.S. Cl.
CPC .............. *G10L 15/26* (2013.01); *G10L 15/28* (2013.01); *H04R 3/12* (2013.01); *G10L 2015/223* (2013.01)

(56) References Cited

U.S. PATENT DOCUMENTS

| | | | | |
|---|---|---|---|---|
| 10,236,016 | B1* | 3/2019 | Li | H04R 1/00 |
| 2011/0065428 | A1* | 3/2011 | Schroeter | H04M 1/72563 |
| | | | | 455/418 |
| 2012/0035924 | A1* | 2/2012 | Jitkoff | G10L 15/24 |
| | | | | 704/235 |
| 2012/0036121 | A1* | 2/2012 | Jitkoff | G06F 3/16 |
| | | | | 707/722 |
| 2013/0073293 | A1* | 3/2013 | Jang | G10L 15/22 |
| | | | | 704/275 |
| 2013/0183944 | A1* | 7/2013 | Mozer | H04L 12/282 |
| | | | | 455/414.1 |
| 2013/0238326 | A1* | 9/2013 | Kim | G10L 15/22 |
| | | | | 704/231 |
| 2014/0172953 | A1* | 6/2014 | Blanksteen | H04W 4/33 |
| | | | | 709/203 |
| 2014/0303971 | A1* | 10/2014 | Yi | G06F 3/167 |
| | | | | 704/233 |
| 2015/0006184 | A1* | 1/2015 | Marti | G10L 15/22 |
| | | | | 704/275 |
| 2015/0070251 | A1* | 3/2015 | Kim | G06F 1/163 |
| | | | | 345/8 |
| 2015/0154134 | A1* | 6/2015 | Beaumont | G06F 3/00 |
| | | | | 710/62 |
| 2015/0154976 | A1* | 6/2015 | Mutagi | H04L 12/281 |
| | | | | 704/275 |
| 2015/0162006 | A1* | 6/2015 | Kummer | G05B 15/02 |
| | | | | 704/275 |
| 2015/0235642 | A1* | 8/2015 | Nishikawa | G01C 21/3608 |
| | | | | 704/249 |
| 2015/0370531 | A1* | 12/2015 | Faaborg | G10L 15/22 |
| | | | | 704/275 |
| 2016/0005404 | A1* | 1/2016 | Yokoya | H04N 21/4882 |
| | | | | 704/275 |
| 2016/0155443 | A1* | 6/2016 | Khan | G10L 15/22 |
| | | | | 704/275 |
| 2016/0203814 | A1* | 7/2016 | Cho | G10L 13/04 |
| | | | | 704/260 |
| 2016/0283190 | A1* | 9/2016 | Nakamura | G06F 3/167 |
| 2016/0284351 | A1* | 9/2016 | Ha | G10L 15/22 |
| 2017/0364324 | A1* | 12/2017 | Lee | G06F 3/048 |
| 2019/0265946 | A1* | 8/2019 | Bae | G06F 3/167 |

FOREIGN PATENT DOCUMENTS

| | | |
|---|---|---|
| EP | 3261087 A1 | 12/2017 |
| JP | 10-276483 A | 10/1998 |
| JP | 2002-318843 A | 10/2002 |
| JP | 2011-033680 A | 2/2011 |
| JP | 2013-179446 A | 9/2013 |
| JP | 2014-045258 A | 3/2014 |
| JP | 6053097 B2 | 12/2016 |
| JP | 6360484 B2 | 7/2018 |
| JP | 6567737 B2 | 8/2019 |
| KR | 10-2015-0036492 A | 4/2015 |
| WO | 2013/128999 A1 | 9/2013 |
| WO | 2014/030540 A1 | 2/2014 |
| WO | 2015/033523 A1 | 3/2015 |

OTHER PUBLICATIONS

International Search Report and Written Opinion of PCT Application No. PCT/JP2016/060792, dated Jun. 21, 2016, 10 pages of ISRWO.

Extended European Search Report of EP Application No. 19187601.0, dated Nov. 29, 2019, 07 pages.

* cited by examiner

| DEVICE | VOICE RECOGNITION RESULT |
|---|---|
| DEVICE 200#1 | ABC NO ··· KETE |
| DEVICE 200#2 | ··· C NO KYOKU KAKETE |
| DEVICE 200#3 | ABC ··· |

| INTEGRATION RESULT | ABC NO KYOKU KAKETE |
|---|---|

FIG. 3

| REQUEST | SUBJECT | TIME | BEHAVIOR |
|---|---|---|---|
| WANT TO KNOW WEATHER FORECAST | USER A | MORNING | MOVE BETWEEN ROOMS |

FIG. 5

| DEVICE ID | DISPLAY OUTPUT | SPEAKER OUTPUT |
|---|---|---|
| SP-01 | 1 | 1 |
| TV-01 | 1 | 1 |
| PS-01 | 0 | 1 |
| SW-01 | 1 | 0 |

FIG. 6

| DEVICE ID | DEVICE TYPE | DISPLAY OUTPUT | SPEAKER OUTPUT |
|---|---|---|---|
| SP-01 | SMARTPHONE | 1 | 1 |
| TV-01 | TELEVISION | 1 | 1 |
| PS-01 | PORTABLE SPEAKER | 0 | 1 |
| SW-01 | SMARTWATCH | 1 | 0 |

| DEVICE TYPE | DEVICE STATE | ESTIMATION METHOD INFORMATION | INAPPROPRIATE RESPONSE METHOD |
|---|---|---|---|
| SMARTPHONE TABLET | INSIDE OUT | ACCELERATION SENSOR INFORMATION | DISPLAY OUTPUT |
| SMARTPHONE | STORED | ILLUMINATION SENSOR INFORMATION | DISPLAY OUTPUT SPEAKER OUTPUT |
| SMARTBAND SMARTWATCH | NOT WORN | PROXIMITY SENSOR INFORMATION | DISPLAY OUTPUT SPEAKER OUTPUT |
| HEAD-MOUNTED DISPLAY | NOT WORN | PROXIMITY SENSOR INFORMATION | DISPLAY OUTPUT SPEAKER OUTPUT |
| ALL | MUTE | SYSTEM INFORMATION | SPEAKER OUTPUT |
| ALL | DISPLAY IN USE | SYSTEM INFORMATION | DISPLAY OUTPUT |
| ALL | SPEAKER IN USE | SYSTEM INFORMATION | SPEAKER OUTPUT |
| ALL | POSITIONED IN DIFFERENT ROOM FROM USER'S | CAMERA INFORMATION | DISPLAY OUTPUT SPEAKER OUTPUT |
| ALL | EARPHONE NOT WORN ON EAR IS CONNECTED | SYSTEM INFORMATION PROXIMITY SENSOR INFORMATION | SPEAKER OUTPUT |

FIG. 8

| DEVICE ID | DEVICE TYPE | DISPLAY OUTPUT | SPEAKER OUTPUT |
|---|---|---|---|
| SP-01 | SMARTPHONE | 0 | 1 |
| TV-01 | TELEVISION | 0 | 0 |
| PS-01 | PORTABLE SPEAKER | 0 | 1 |
| SW-01 | SMARTWATCH | 0 | 0 |

FIG. 9

| REQUEST | SUBJECT | TIME | BEHAVIOR | PRIORITY RESPONSE METHOD |
|---|---|---|---|---|
| WANT TO LISTEN TO MUSIC | (ANY) | (ANY) | (ANY) | SPEAKER OUTPUT WITH FAVORABLE AUDIO QUALITY |
| WANT TO VIEW LIVE MOVING IMAGE | PLURALITY OF USERS | (ANY) | (ANY) | LARGE DISPLAY OUTPUT |
| WANT TO KNOW WEATHER FORECAST | USER A | MORNING | MOVE BETWEEN ROOMS | SPEAKER OUTPUT OF MOUNTED DEVICE |

FIG. 15

| DEVICE ID | DEVICE TYPE | DISPLAY OUTPUT | SPEAKER OUTPUT |
|---|---|---|---|
| SP-01 | SMARTPHONE | 0 | 0 |
| TV-01 | TELEVISION | 0 | 0 |
| PS-01 | PORTABLE SPEAKER | 0 | 1 |
| SW-01 | SMARTWATCH | 1 | 0 |

| TYPE OF CONTENT | COMBINATION OF RESPONSE METHODS | RESPONSE CONTENT |
|---|---|---|
| MUSIC | DISPLAY OUTPUT<br>SPEAKER OUTPUT | OUTPUT MUSIC THROUGH SPEAKER<br>DISPLAY LYRICS ON DISPLAY |
| LIVE MOVING IMAGE | DISPLAY OUTPUT OF DEVICE A<br>SPEAKER OUTPUT OF DEVICE A<br>DISPLAY OUTPUT OF DEVICE B | REPRODUCE LIVE MOVING IMAGE IN DEVICE A<br>DISPLAY INFORMATION RELATED TO ARTIST IN DEVICE B |
| PLURALITY OF PHOTOGRAPHS | DISPLAY OUTPUT OF DEVICE A<br>DISPLAY OUTPUT OF DEVICE B | DISPLAY DIFFERENT PHOTOGRAPHS ON DEVICE A AND DEVICE B |
| GAME | DISPLAY OUTPUT OF DEVICE A<br>DISPLAY OUTPUT OF DEVICE B | DISPLAY GAME SCREEN IN DEVICE A<br>DISPLAY INFORMATION RELATED TO GAME ON DEVICE B |
| WEATHER FORECAST | DISPLAY OUTPUT OF DEVICE A<br>DISPLAY OUTPUT OF DEVICE B | DISPLAY WEEKLY WEATHER FORECAST ON LARGER DISPLAY<br>DISPLAY WEATHER FORECAST OF DAY ON SMALLER DISPLAY |

FIG. 17

| DEVICE ID | DISPLAY OUTPUT 1 | DISPLAY OUTPUT 2 | ... | SPEAKER OUTPUT 1 | SPEAKER OUTPUT 2 | ... |
|---|---|---|---|---|---|---|
| SP-01 | 1 | 0 | ... | 1 | 0 | ... |
| TV-01 | 1 | 1 | ... | 1 | 1 | ... |
| PS-01 | 0 | 0 | ... | 1 | 0 | ... |
| SW-01 | 1 | 0 | ... | 0 | 0 | ... |

22

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/060792 filed on Mar. 31, 2016, which claims priority benefit of Japanese Patent Application No. JP 2015-101845 filed in the Japan Patent Office on May 19, 2015. Each of the above-referenced applications is hereby incorporated herein by reference in its entirety.

TECHNICAL FIELD

The present disclosure relates to an information processing device, an information processing method, and a program.

BACKGROUND ART

In recent years, information processing devices with a user interface using voice have been developed. Among such information processing devices, a device that performs a voice recognition process using a voice of a user as an input and presents a service or the like to the user on the basis of a result of the voice recognition process is known.

For example, a voice processing device that calculates a score indicating a degree of congruity with intention information from an input voice signal and presents information corresponding to intention information having a degree of reliability of a threshold value or more among intention information selected on the basis of the score is disclosed in Patent Literature 1. Therefore, according to the voice processing device, it is possible to present information according to the intention of the user.

CITATION LIST

Patent Literature

Patent Literature 1: JP 2011-33680A

DISCLOSURE OF INVENTION

Technical Problem

However, in the voice processing device disclosed in Patent Literature 1, in a case in which there are a plurality of devices that are able to respond to the user in addition to the device itself, it is difficult to select a device suitable for giving a response from the plurality of devices. Therefore, the plurality of devices perform responses such as presentation of the information at the same timing, and the user may find it difficult to understand response content.

In this regard, the present disclosure proposes an information processing device, an information processing method, and a program, which are novel and improved and capable of causing a device which is desirable to the user among a plurality of devices to give a response.

Solution to Problem

According to the present disclosure, there is provided an information processing device including: an input unit configured to obtain information related to a voice of a user and device information of each of a plurality of devices; and a selecting unit configured to select a device from the plurality of devices on the basis of an aspect specified by at least one of the information related to the voice and the device information obtained by the input unit and the device information.

Further, according to the present disclosure, there is provided an information processing method including: obtaining, by an input unit, information related to a voice of a user and device information of each of a plurality of devices; and selecting a device from the plurality of devices on the basis of an aspect specified by at least one of the information related to the voice and the device information obtained by the input unit and the device information.

Further, according to the present disclosure, there is provided a program causing a computer to implement: an input function configured to obtain information related to a voice of a user and device information of each of a plurality of devices; and a selecting function configured to select a device from the plurality of devices on the basis of an aspect specified by at least one of the information related to the voice and the device information obtained by the input function and the device information.

Advantageous Effects of Invention

As described above, according to the present disclosure, an information processing method and a program capable of causing a device which is desirable to a user among a plurality of devices to give a response are provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a block diagram illustrating an example of a schematic functional configuration of an information processing system including an information processing device according to a first embodiment of the present disclosure.

FIG. 2 is a diagram for describing an example of a voice recognition result integration process in the information processing device according to the embodiment.

[FIG. 3] FIG. 3 is a diagram for describing an example of user context information in the information processing device according to the embodiment.

FIG. 4 is a diagram illustrating an example of a device list generated by the information processing device according to the embodiment.

[FIG. 5] FIG. 5 is a diagram illustrating an example of a response method presence/absence table of a device stored in the information processing device according to the embodiment.

[FIG. 6] FIG. 6 is a diagram illustrating an example of a device-response method table which is generated and updated by the information processing device according to the embodiment.

[FIG. 7] FIG. 7 is a diagram illustrating an example of a device-state-inappropriate response method table stored in the information processing device according to the embodiment.

[FIG. 8] FIG. 8 is a diagram illustrating an example of a device-response method table which is generated and updated by the information processing device according to the embodiment.

[FIG. 9] FIG. 9 is a diagram illustrating an example of a user context-priority response method table stored in the information processing device according to the embodiment.

FIG. 10 is a diagram illustrating an example of a device-response method table which is generated and updated by the information processing device according to the embodiment.

FIG. 11 is a flowchart conceptually illustrating an overview of a process of the information processing device according to the embodiment.

FIG. 12 is a flowchart conceptually illustrating a device selection process of the information processing device according to the embodiment.

FIG. 13 is a block diagram illustrating an example of a schematic functional configuration of an information processing system including an information processing device according to a first modified example of the embodiment.

FIG. 14 is a block diagram illustrating another example of a schematic functional configuration of an information processing system including an information processing device according to the first modified example of the embodiment.

[FIG. 15] FIG. 15 is a diagram illustrating an example of a device-response method table which is generated and updated by an information processing device according to a second embodiment of the present disclosure.

[FIG. 16] FIG. 16 is a diagram illustrating an example of a device combination-response content table stored in the information processing device according to the embodiment.

[FIG. 17] FIG. 17 is a diagram illustrating an example of a response method presence/absence table of a device stored in an information processing device according to a second modified example of the same embodiment.

FIG. 18 is an explanatory diagram illustrating a hardware configuration of an information processing device according to one embodiment of the present disclosure.

MODE(S) FOR CARRYING OUT THE INVENTION

Figure 1:
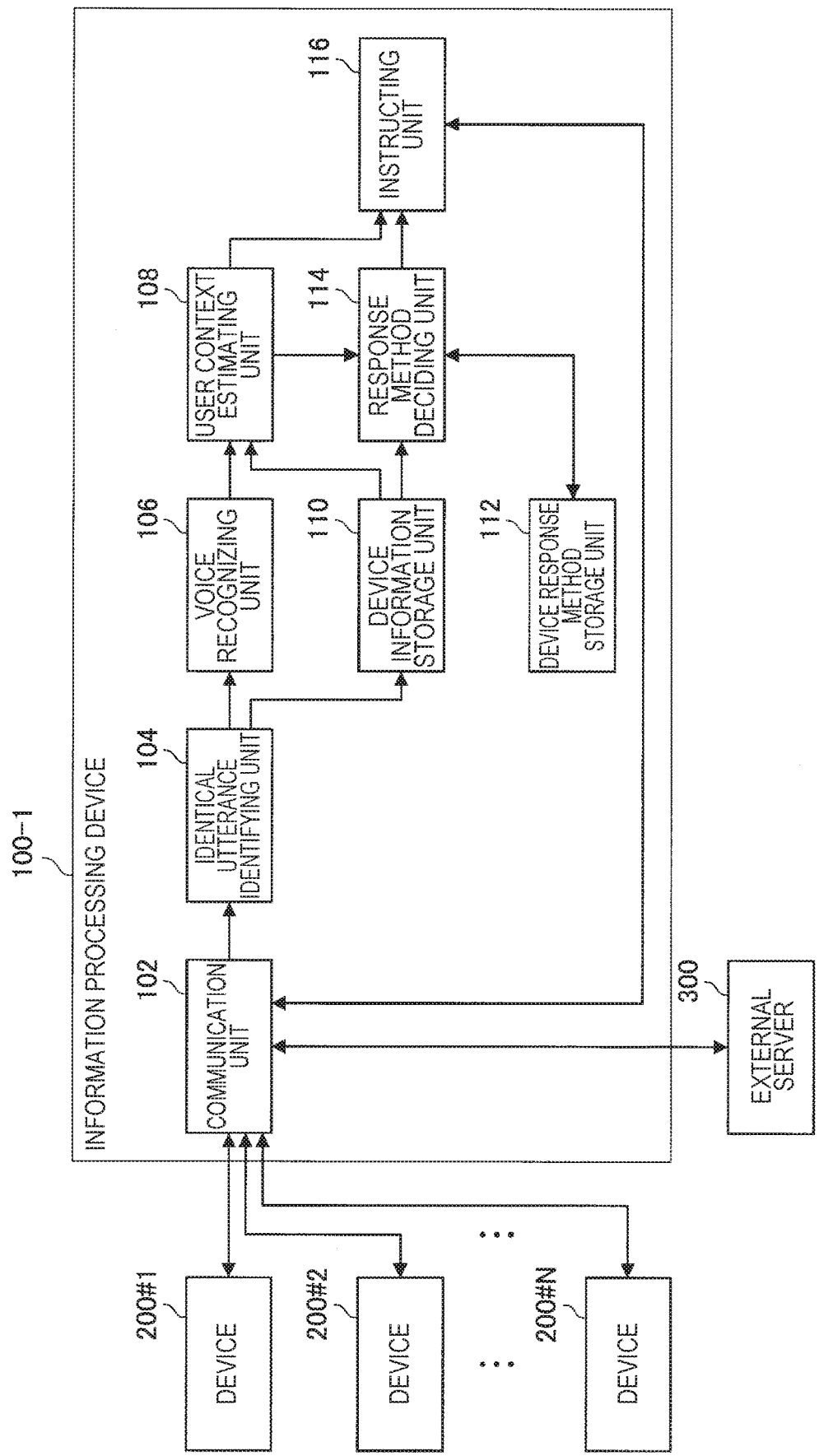
[FIG. 1]

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, in this specification and the drawings, a plurality of constituent elements having substantially the same functional configuration may be distinguished by assigning the same reference numerals followed by different numbers. For example, a plurality of components having substantially the same function are distinguished as in devices 200#1 and 200#2 as necessary. However, in a case in which it is not necessary to distinguish substantially the same functional components, only the same reference numerals are assigned. For example, in a case in which it is not necessary to particularly distinguish devices 200#1 and 200#2, they are referred to simply as a "device 200."

The description will proceed in the following order.
1. Problems of related art
2. First embodiment (case in which a single device is selected)
3. Second embodiment (case in which two or more devices are selected)
4. Hardware configuration of information processing device according to one embodiment of present disclosure
5. Conclusion 1. Problems of Related Art First, problems of an information processing device with a user interface using voice according to a related art will be described.

An information processing device according to a related art includes a voice input function, a voice recognition function, and an output function. The voice input function converts a voice of the user into a voice signal. The voice recognition function estimates a character string related to the voice on the basis of the voice signal. Then, the output function outputs a voice, an image, or the like. Therefore, the information processing device according to the related art is able to estimate the character string uttered by the user and output a voice, an image, or the like on the basis of the estimated character string.

In recent years, voice recognition technology has improved, devices with a voice recognition function have been downsized, and devices (hereinafter also referred to as "responding devices") that perform a response using a voice recognition process provided by an external service represented by a cloud service have been widely spread. For this reason, it can be assumed that there are a plurality of responding devices in the same space, for example, in the same room.

Here, in the voice recognition process, in general, a predetermined activation phrase (hereinafter also referred to as an "activation phrase") is used to distinguish a conversation and an utterance serving as a voice recognition target. However, in a case in which there are a plurality of responding devices, it is necessary for the user to remember activation phrases which are equal in number to the responding devices.

On the other hand, the activation phrase may not be used, or an activation phrase common to a plurality of responding devices may be used. However, in this case, a plurality of responding devices are likely to give a response at the same timing. Further, there are cases in which some of a plurality of responses may not be responses desirable to the user.

Furthermore, a responding device from which the user desires a response may be estimated. For example, each responding device or a device connected to each responding device estimates a responding device toward which the user speaks on the basis of a positional relation of the responding devices, a voice acquisition timing, a volume, or the like.

However, in this case, when the user does not speak toward the responding device, it is difficult to specify a responding device which is to respond.

Further, in this case, a responding device near a position at which the user speaks may be selected, but the responding device may not be suitable for giving a response. For example, in a case in which a responding device having a display is selected, when the display of the responding device faces a direction in which it is not visible to the user, although response content is displayed on the display of the responding device, it is difficult for the user to check the response content.

In this regard, the present disclosure proposes an information processing device 100 which is capable of causing a device which is desirable to the user among a plurality of devices to give a response. The information processing device 100 will be sequentially described below in detail. For the sake of convenience of description, information processing devices 100 according to first and second embodiments are distinguished by assigning numbers corresponding to the embodiments to the end as in an information processing device 100-1 and an information processing device 100-2.

2. First Embodiment (Case in Which Single Device is Selected)

The problems of the related art have been described above. Next, an information processing device 100-1 according to a first embodiment of the present disclosure will be described. In the first embodiment, a single device is selected from a plurality of devices on the basis of information related to a voice of the user and device information.
<2-1. Configuration of Device>

First, a functional configuration of an information processing system including the information processing device 100-1 equipped with the information processing device 100-1 according to the first embodiment of the present disclosure will be described with reference to FIG. 1. FIG. 1 is a block diagram illustrating an example of a schematic functional configuration of the information processing system including the information processing device 100-1 according to the first embodiment of the present disclosure.

As illustrated in FIG. 1, the information processing system includes the information processing device 100-1, a plurality of devices 200, and an external server 300.
(Information Processing Device)

The information processing device 100-1 includes a communication unit 102, an identical utterance identifying unit 104, a voice recognizing unit 106, a user context estimating unit 108, a device information storage unit 110, a device response method storage unit 112, a response method deciding unit 114, and an instructing unit 116.

The communication unit 102 serves as an input unit and performs communication with an external device of the information processing device 100-1. Specifically, the communication unit 102 receives voice information serving as information related to a voice and device information serving as device information from each of the devices 200, and transmits operation instruction information to each of the devices 200. Further, the communication unit 102 transmits the content request information to the external server 300 and receives content information from the external server 300. For example, the communication unit 102 performs communication with the device 200 and the external server 300 via a network such as the Internet. The communication unit 102 may perform direct communication with the device 200 and the external server 300 or may perform indirect communication with them via another external device. The information processing device 100-1 may be directly connected to each of the devices 200 through wired communication or wireless communication.

The identical utterance identifying unit 104 identifies a group of voice information and device information (hereinafter also referred to as "voice information and the like"). Specifically, the identical utterance identifying unit 104 identifies the group to which the voice information and the like belong on the basis of identification information included in the voice information and the like received by the communication unit 102. For example, the group corresponds to the user, that is, a group of the devices 200 owned the user. Further, the identification information may be a reception time of the voice information from each of the devices 200, a degree of similarity of the voice information (voice signal), a transmission source Internet protocol (IP) address, a group identifier (ID), or the like. Therefore, the identical utterance identifying unit 104 identifies the group of the voice information and the like on the basis of a degree of coincidence or similarity of the identification information included in the voice information and the like, and presents the voice information and the like to the voice recognizing unit 106 or device information storage unit 110 on an identified group basis. The information processing device 100-1 performs a process on a group basis.

The group of the devices 200 may be connected by a local area network (LAN). In this case, the identical utterance identifying unit 104 may identify the group on a LAN basis.

The voice recognizing unit 106 performs the voice recognition on the basis of the voice information. Specifically, the voice recognizing unit 106 generates character string information by performing voice recognition on the basis of a signal which is included in each of a plurality of pieces of voice information and generated on the basis of a voice (hereinafter also referred to as a "voice signal"). For example, the voice recognizing unit 106 may perform the voice recognition using a voice signal having a higher signal characteristic, for example, a higher signal noise (SN) ratio, than the other voice signals of a plurality of voice signals. A voice signal serving as a voice recognition target is distinguished from a voice signal which is not the voice recognition target such as a conversation and then undergoes the voice recognition. For example, the voice recognizing unit 106 extracts the voice signal serving as the voice recognition target in accordance with an activation phrase or other methods and performs the voice recognition only on the extracted voice signal. Further, the voice information may include only the voice signal of the voice recognition target.

The voice recognizing unit 106 may perform the voice recognition using a voice signal obtained by performing a noise suppression process using a plurality of voice signals.

Figure 2:
[FIG. 2]

Further, the voice recognizing unit 106 may integrate voice recognition results obtained by performing the voice recognition on each of a plurality of voice signals. The integration of the voice recognition results will be described in detail with reference to FIG. 2. FIG. 2 is a diagram for describing an example of a voice recognition result integration process in the information processing device 100-1 according to the present embodiment.

First, the voice recognizing unit 106 performs the voice recognition on the basis of the voice signal included in the voice information received from each of the devices. For example, the voice recognizing unit 106 performs the voice recognition on the basis of the voice signal obtained from each of devices 200#1 to 200#3 and obtains each piece of character string information serving as the voice recognition result illustrated in the upper table of FIG. 2. Since each voice recognition result is obtained in accordance with each voice signal for the device 200, the voice recognition results may be different as illustrated in an upper table of FIG. 2.

Then, the voice recognizing unit 106 obtains a new voice recognition result by integrating the voice recognition results. For example, the voice recognizing unit 106 obtains character string information corresponding to all pieces of utterance content illustrated in a lower table of FIG. 2 by integrating the character string information corresponding to some pieces of utterance content corresponding to the devices 200#1 to 200#3 illustrated in the upper table of FIG. 2.

In this case, by improving the accuracy of the voice recognition result, it is possible to improve the accuracy of the response content to the user, and it is possible to reduce a possibility of giving the user an uncomfortable feeling about the response.

The user context estimating unit 108 estimates user context serving as an aspect of the user on the basis of at least one of the voice information and the device information as a second estimating unit. Specifically, the user context estimating unit 108 estimates the user context on the basis of information such as reception time of the voice recognition result, the device information, the voice information, or the like The user context will be described in detail with reference to FIG. 3. FIG. 3 is a diagram for describing an example of the user context information in the information processing device 100-1 according to the present embodiment.

First, the user context information includes information related to an element indicating the aspect of the user (hereinafter also referred to as "context configuration information"). For example, the user context information includes the context configuration information indicating each of a request, a subject, a time, and a behavior as illustrated in FIG. 3. For information that is not obtained, a storage field for the context configuration information may be empty.

Then, the user context estimating unit 108 obtains the context configuration information on the basis of the voice recognition result or the like. Specifically, the user context estimating unit 108 analyzes the character string serving as a voice recognition result, identifies the user on the basis of the user information, estimates the aspect of the user on the basis of sensor information included in the device information such as a behavior of the user or a position of the user, acquires the reception time of the voice information and the like, and generates the context configuration information.

For example, in a case in which a voice recognition result related to an utterance of a user A is "How is the weather today?," the user context estimating unit 108 estimates that the request is "I want to know the weather forecast" in accordance with the analysis of the voice recognition result. Further, the user context estimating unit 108 estimates that the subject of the request is the user A from the user information, for example login information of the user for a service provided by the information processing device 100-1. Further, the user context estimating unit 108 estimates that a time is "morning" from the reception time of the voice information and the like related to the utterance of the user A, and estimates that a behavior is "moving between rooms" from the sensor information included in the device information, for example, information of an acceleration sensor. Then, the user context estimating unit 108 generates the user context information illustrated in FIG. 3 by using the obtained context configuration information.

The user context estimating unit 108 may identify the user on the basis of image information in addition to the user information. For example, the user context estimating unit 108 acquires image information obtained by imaging from the device 200 having an imaging function of imaging the user as a subject through the communication unit 102, performs a face recognition process on the acquired image information, and identifies the user. Further, the user context estimating unit 108 may perform speaker identification using the image information.

The example in which the estimation of the user context is performed when the voice information and the like are received has been described above, but a part of the estimation of the user context may be performed in advance. For example, in a case in which the device information is periodically received separately from the voice information, the user context estimating unit 108 generates context configuration information indicating a behavior which is a part of the user context information on the basis of the sensor information or the like included in the received device information. Then, when the voice information is received, the user context estimating unit 108 generates the user context information by generating the remaining context configuration information, for example, the context configuration information indicating a subject, a time, and the like. In this case, by reducing a time from the receipt of the voice information to the generation of the user context information, it is possible to reduce a time lag between the utterance of the user and the response to the user.

The device information storage unit 110 stores the device information. More specifically, the device information storage unit 110 stores the device information received by the communication unit 102 and updates the device information in a case in which the device information is duplicated. For example, the device information includes a device ID identifying the device 200, the sensor information obtained from the sensor of the device 200, operation status information indicating an operation status of the device 200, and battery information indicating a remaining battery level of the device 200.

The device response method storage unit 112 stores the response method included in the device 200. Specifically, the device response method storage unit 112 stores the response method serving as the operation function of the device 200 for each type of device 200 or for each device 200. Examples of the response method of the device 200 include a display output of the display, a voice output of the speaker, and a tactual vibration output (vibration) performed by the motor.

The response method deciding unit 114 decides the response to the user. Specifically, the response method deciding unit 114 selects the device 200 that gives a response from a plurality of devices 200 on the basis of an aspect specified from at least one of the voice information and the device information and the device information as a selecting unit. More specifically, the specified aspect includes a state of the device 200 and the aspect of the user, and the response method deciding unit 114 selects the device 200 on the basis of the state of the device 200, the aspect of the user, and the device information.

Figure 4:
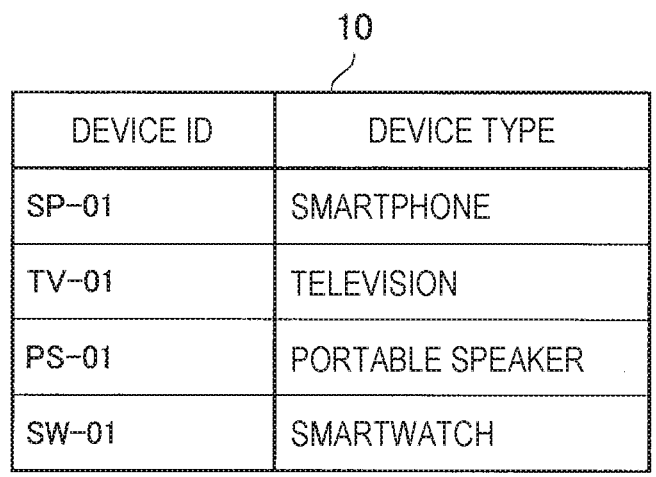
[FIG. 4]
Figure 10:
[FIG. 10]

Further, a process of the response method deciding unit 114 will be described in detail with reference to FIGS. 4 to 10. FIG. 4 is a diagram illustrating an example of a list of devices 200 generated by the information processing device 100-1 according to the present embodiment, and FIG. 5 is a diagram illustrating an example of a response method presence/absence table of the device 200 stored in the information processing device 100-1 according to the present embodiment. FIGS. 6, 8, and 10 are diagrams illustrating an example of a device-response method table which is generated and updated by the information processing device 100-1 according to the present embodiment. FIG. 7 is a diagram illustrating an example of a device state-inappropriate response method table stored in the information processing device 100-1 according to the present embodiment. FIG. 9 is a diagram illustrating an example of a user context-priority response method table stored in the information processing device 100-1 according to the present embodiment.

(Generation of Device-Response Method Table)

First, the response method deciding unit 114 lists up candidates of the device 200 that performs the response. For example, if the voice information is received, the response method deciding unit 114 acquires the device information of the devices 200 belonging to the user of the voice information, that is, a group from the device information storage unit 110. For example, a list 10 of information including a device ID and a device type illustrated in FIG. 4 is generated. The obtained list may include only the device ID.

Then, the response method deciding unit 114 acquires the response methods of the devices 200 that are listed up. For example, the response method deciding unit 114 gives a notification of the device IDs included in the list to the device response method storage unit 112, and acquires information about the response methods of the devices 200 corresponding to the device IDs from the device response method storage unit 112.

For example, the device response method storage unit 112 stores a response method presence/absence table 20 that manages the presence and absence of a response method (for example, a display output and a speaker output) corresponding to the device ID illustrated in FIG. 5 and transmits information indicating the presence and absence of the response methods corresponding to the notified device IDs to the response method deciding unit 114. "1" illustrated in FIG. 5 indicates the presence, and "0" indicates the absence. Further, the device response method storage unit 112 may be a database (DB) and a database management system (DBMS).

Then, the response method deciding unit 114 generates a table for the listed-up devices 200 using the acquired response methods. For example, the response method deciding unit 114 generates a table 30 indicating a correspondence relation between the device ID and the presence and absence of the response method illustrated in FIG. 6 (hereinafter also referred to as a "device-response method table") on the basis of the list of the devices 200 and the response method acquired from the device response method storage unit 112.
(Update of Device-Response Method Table Based on Device Information)

Subsequently, the response method deciding unit 114 estimates the state of the device 200 using at least one of the sensor information and the operation status information of the device 200 as a first estimating unit. For example, the response method deciding unit 114 estimates the state of the device 200 on the basis of the sensor information such as acceleration sensor information or illuminance sensor information or the operation status information such as system information which are indicated in a field of estimation method information of a device state-inappropriate response method table 40 illustrated in FIG. 7.

For example, for the device 200 having the device ID of SP-01 as illustrated in FIG. 6, the response method deciding unit 114 estimates that the device 200 is in an inside-out from the acceleration sensor information. Similarly, the response method deciding unit 114 estimates that the device 200 having the device ID of SW-01 is in a non-mounted state from proximity sensor information, and estimates that the device 200 having the device ID of TV-01 is using the display and the speaker from system information.

Then, the response method deciding unit 114 selects the device 200 on the basis of a correspondence relation between the state of the device 200 and the response method serving as a first correspondence relation. For example, the response method deciding unit 114 updates the device-response method table on the basis of the correspondence relation between the state of the device 200 and an unsuitable response method (hereinafter also referred to as an "inappropriate response method") illustrated in FIG. 7.

For example, in a case in which a smartphone having the device ID is SP-01 is estimated to be inside out, the response method deciding unit 114 determines that the display output is the inappropriate response method from the correspondence relation of the state of the device 200 and the inappropriate response method of the device state-inappropriate response method table 40 illustrated in FIG. 7. Then, the response method deciding unit 114 changes information about the presence or absence of the display output of the smartphone having the device ID of SP-01 from 1 to 0, that is, changes the display output from the presence to the absence as indicated by dots in FIG. 8. Similarly, the response method deciding unit 114 changes the information about the presence or absence of the display output and the speaker output of a television having the device ID of TV-01 from 1 to 0, and changes information about the presence or absence of the display output of a smartwatch having the device ID of SW-01 from 1 to 0. As a result, a device-response method table 30 illustrated in FIG. 6 is updated to a device-response method table 32 illustrated in FIG. 8.

The device state-inappropriate response method table 40 is stored in a separate storage unit which is separately installed in the information processing device 100-1. Further, the device state-inappropriate response method table 40 may be set by the user. For example, addition, change, or deletion of content of the table is performed. Further, the user may set the content of the table when the device 200 is newly connected.
(Update of Device-Response Method Table Based on User Context Information)

Subsequently, the response method deciding unit 114 selects the device 200 on the basis of a correspondence relation between the aspect of the user and priority information of the response method as a second correspondence relation. For example, the response method deciding unit 114 updates the device-response method table on the basis of the correspondence relation between the user context information and a response method to be given a priority (hereinafter also referred to as a "priority response method") illustrated in FIG. 9.

For example, in a case in which a user context including a request of desiring to listen to music is estimated, the response method deciding unit 114 specifies that a speaker output with favorable audio quality is the priority response method from the correspondence relation between the user context information and the priority response method in a user context-priority response method table 50 illustrated in FIG. 9. Then, the response method deciding unit 114 changes information about the presence or absence of the speaker output of the smartphone whose audio quality is lower than that of a portable speaker from 1 to 0, that is, changes the speaker output from the presence to the absence as indicated by dots in FIG. 10. As a result, a device-response method table 32 illustrated in FIG. 8 is updated to a device-response method table 34 illustrated in FIG.

The updating of the table based on the priority response method is performed on the basis of a characteristic of the response method. For example, in a case in which a "speaker output with favorable audio quality" is specified as the priority response method, the response method deciding unit 114 compares performances (so-called specification) related to the speaker output of the device 200 whose speaker output is set to the presence, for example, an input wattage level, and selects the device 200 whose response method is set to the presence. The information of the specification may be included in the device information.

Further, the user context-priority response method table 50 is stored in a separate storage unit which is separately installed in the information processing device 100-1. Further, the user context-priority response method table 50 may be set by the user. For example, addition, change, or deletion of content of the table is performed.

Returning to the description of the functional configuration of the information processing device 100-1 with reference to FIG. 1, the instructing unit 116 instructs the device 200 selected by the response method deciding unit 114 to perform an operation related to operation content specified on the basis of the voice information as an operation instructing unit. Specifically, the instructing unit 116 specifies content of a notification to be given to the user on the basis of the user context estimated by the user context estimating unit 108, and notifies the selected device 200 of the content of the notification to be given to the user.

For example, the instructing unit 116 acquires the content information specified from the user context estimated by the user context estimating unit 108 from the external server 300 through the communication unit 102. Then, the instructing unit 116 instructs the device 200 specified from the device-response method table 34 updated by the response method deciding unit 114 to give a notification indicating the acquired content information to the user in accordance with the response method similarly specified from the device-response method table 34. The instructing unit 116 gives a notification indicating the operation instruction accompanied by the content information to the selected device 200 through the communication unit 102.

(Device)

The device 200 collects information around the device 200, that is, the user, and notifies the user of the information. Further, the devices 200 may be connected to each other via a LAN. The LAN may be a wired network or a wireless network.

Specifically, the device 200 includes a sound collecting unit, a device information generating unit, a communication unit, and a user notifying unit.

The sound collecting unit converts a sound around the device 200 into a voice signal and generates the voice information including the voice signal. For example, the sound collecting unit may be a microphone or the like.

The device information generating unit generates the sensor information indicating a situation around the device 200 and the state of the device 200. For example, the sensor may be a combination of one or more of sensors such as an acceleration sensor, an angular velocity sensor, an illumination sensor, a proximity sensor, an imaging sensor, a temperature sensor, and a position sensor such as a global positioning system (GPS) sensor.

Further, the device information generating unit generates operation status information indicating the operation status of the device 200. For example, the operation status information of the device 200 is information indicating the presence or absence of an operation of an operation method, that is, the response method of the device 200. For example, the response method may be the display output, the speaker output, or the like. The device 200 may have a plurality of response methods.

The communication unit performs communication with the information processing device 100-1. For example, the communication unit transmits the voice information, the sensor information, and the operation status information to the information processing device 100-1 and receives the operation instruction accompanied by the content information from the information processing device 100-1.

The user notifying unit gives a notification to the user using an instructed response method. For example, the user notifying unit gives a notification indicating content to be received in accordance with the operation instruction to the user in accordance with the response method specified from the operation instruction received by the communication unit. For example, in a case in which the display output is instructed as the response method, the user notifying unit causes the display of the device 200 to display an image based on the image information received in accordance with the operation instruction.

(External Server)

The external server 300 provides the content information. Specifically, the external server 300 stores the content information related to the content to be output from the device 200. If a content request is received from the information processing device 100-1, the external server 300 acquires the content information corresponding to the content request, and transmits the acquired content information to the information processing device 100-1. For example, the content information may be image information such as a moving image or a still image, voice information such as music or a conversation, a character information, information for referring to content such as a content title or a uniform resource locator (URL) related to content, or a combination of the information.

<2-2. Process of Device>

Next, a process of the information processing device 100-1 according to the present embodiment will be described.

Figure 11:
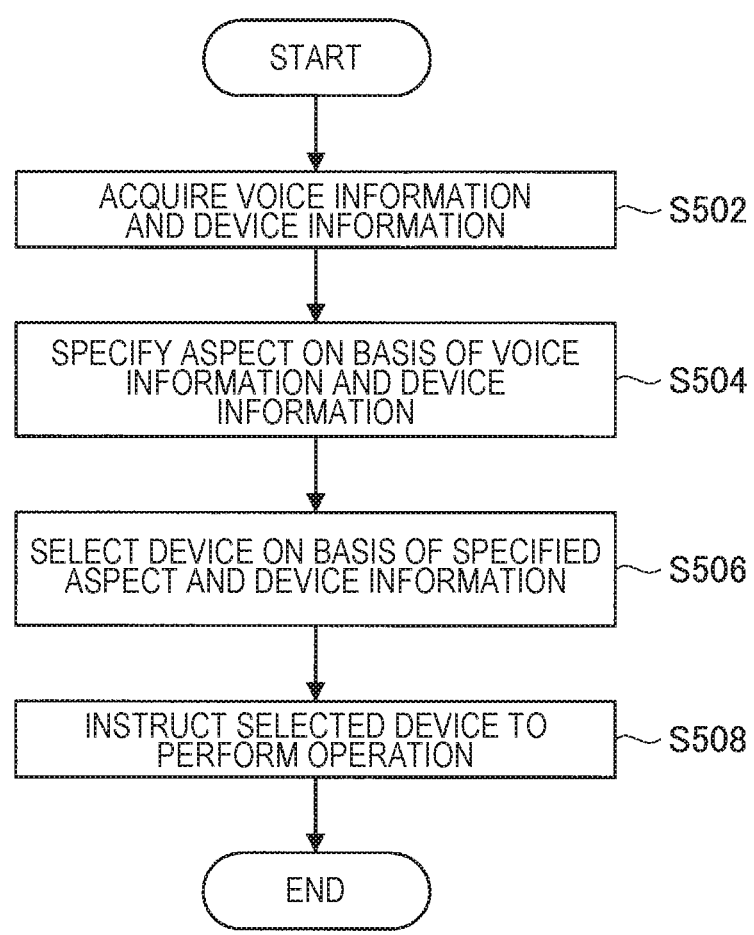
[FIG. 11]

First, an overview of a process of the information processing device 100-1 according to the present embodiment will be described with reference to FIG. 11. FIG. 11 is a flowchart conceptually illustrating the overview of the process of the information processing device 100-1 according to the present embodiment.

The information processing device 100-1 obtains the voice information and the device information (step S502). Specifically, the communication unit 102 receives the voice information and the device information from the device 200. The voice information and the device information may be received as one piece of information or may be received individually. Further, the device information may be received in a case in which the device 200 is newly connected to with the information processing device 100 or in a case in which the device 200 is recognized as a service target of the information processing device 100 or may be received periodically or as a response to a request for the device information from the information processing device 100-1.

Then, the information processing device 100-1 identifies the aspect on the basis of the voice information and the device information (step S504). Specifically, the user context estimating unit 108 estimates the aspect of the user that is, the user context on the basis of the voice information and the device information. Further, the response method deciding unit 114 estimates the state of the device 200 on the basis of the device information. The details will be described later. As described above, some or all of the user context and the state of the device 200 may be estimated in advance.

Then, the information processing device 100-1 selects the device 200 on the basis of the specified aspect and the device information (step S506). Specifically, the response method deciding unit 114 selects the device 200 on the basis of the estimated user context and the estimated state of the device 200. The details will be described later.

Then, the information processing device 100-1 gives an operation instruction to the selected device 200 (step S508). Specifically, the instructing unit 116 notifies the selected device 200 of the operation instruction together with the content information corresponding to the estimated user context.

Figure 12:
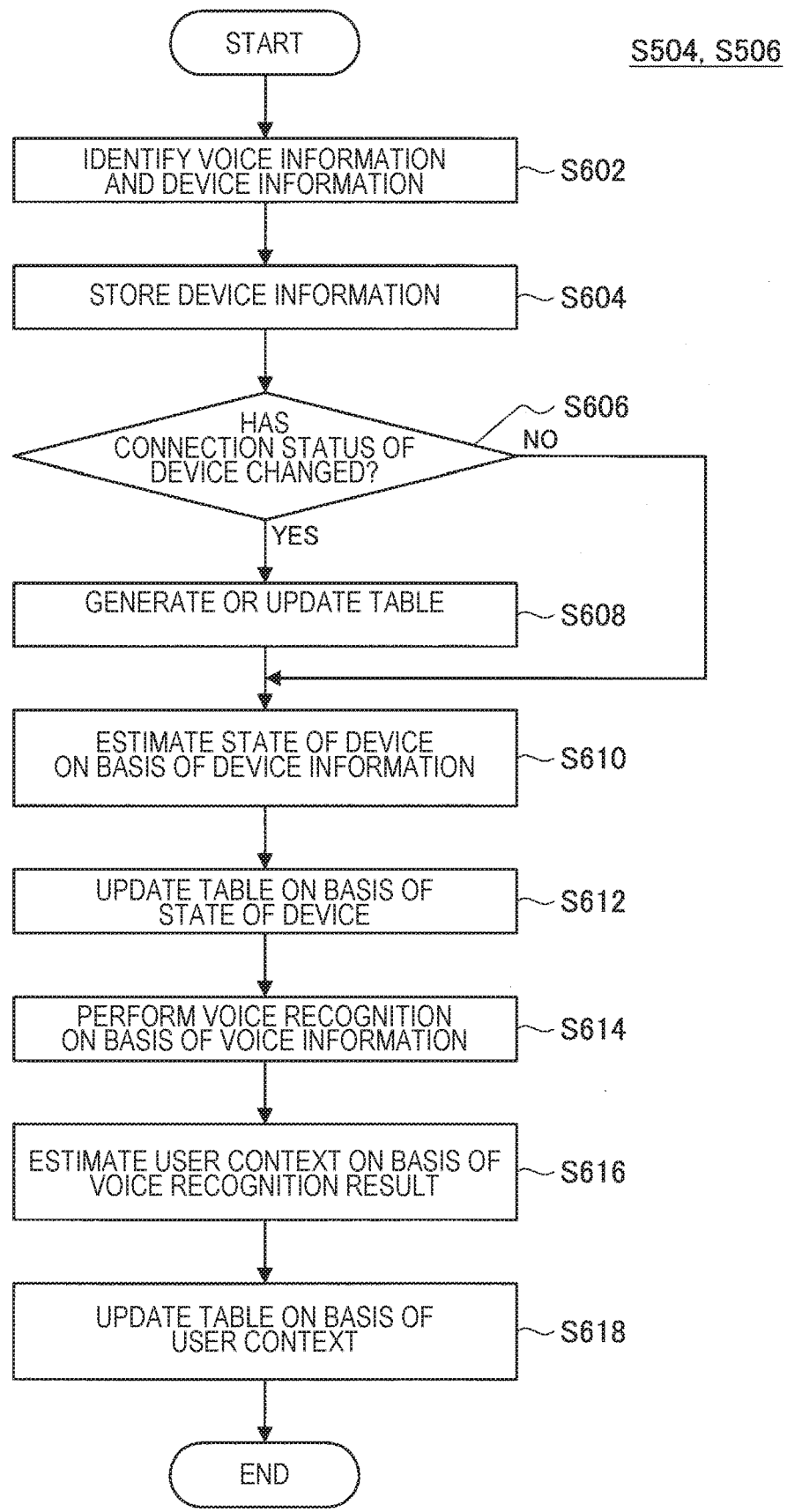
[FIG. 12]

Next, a device selection process of the information processing device 100-1 according to the present embodiment will be described with reference to FIG. 12. FIG. 12 is a flowchart conceptually illustrating the device selection process of the information processing device 100-1 according to the present embodiment.

The information processing device 100-1 identifies the voice information and the device information (step S602). Specifically, if the voice information and the like are received by the communication unit 102, the identical utterance identifying unit 104 identifies a group to which the voice information and the like belong. A subsequent process including step S604 is performed on a group basis.

Then, the information processing device 100-1 stores the device information (step S604). Specifically, the device information storage unit 110 stores the device information received by the communication unit 102. For the device information which has been already received, the device information may be overwritten, or a difference of the device information may be additionally written. Further, previous device information may be stored as history information.

Then, the information processing device 100-1 determines whether or not the connection status of the device 200 has changed (step S606). Specifically, if the voice information is received by the communication unit 102, the response method deciding unit 114 acquires the device information of the group to which the voice information belongs from the device information storage unit 110, and generates a list of the devices 200 using the acquired device information. Then, the response method deciding unit 114 compares the generated list with a previously generated list and determines whether or not the number of connections of the devices 200, the connected device 200, or the like have changed. A field of the device ID of the device-response method table which is generated previously may be used instead of the previously generated list.

In a case in which the connection status of the device 200 is determined to have changed, the information processing device 100-1 generates or updates the device-response method table (step S608). Specifically, in a case in which the number of connections of the devices 200 or the like is determined to have changed, the response method deciding unit 114 acquires the response method corresponding to the listed-up device information from the device response method storage unit 112, and generates the device-response method table on the basis of the acquired response method and the list of the device information.

Then, the information processing device 100-1 estimates the state of the device 200 on the basis of the device information (step S610). Specifically, the response method deciding unit 114 estimates the state of the device 200 on the basis of the sensor information or the operation status information included in the device information.

Then, the information processing device 100-1 updates the device-response method table on the basis of the state of the device 200 (step S612). Specifically, the response method deciding unit 114 updates the device-response method table on the basis of the estimated state of the device 200 and the device state-inappropriate response method table.

Then, the information processing device 100-1 performs the voice recognition on the basis of the voice information (step S614). Specifically, if the voice information is received by the communication unit 102, the voice recognizing unit 106 performs the voice recognition using the voice signal included in the voice information.

Then, the information processing device 100-1 estimates the user context on the basis of the voice recognition result (step S616). Specifically, the user context estimating unit 108 generates the user context information on the basis of the character string information which is the voice recognition result of the voice recognizing unit 106, the sensor information or the like included in the device information, or the like.

Then, the information processing device 100-1 updates the device-response method table on the basis of the user context (step S618). Specifically, the response method deciding unit 114 updates the device-response method table on the basis of the user context information generated by the user context estimating unit 108 and the user context-priority response method table.

Thus, according to the first embodiment of the present disclosure, the information processing device 100-1 obtains the voice information of the user and the device information of each of the plurality of devices 200. Then, the information processing device 100-1 selects the device 200 from a plurality of devices 200 on the basis of the aspect specified from at least one of the obtained voice information and the device information and the device information. Therefore, since the device 200 capable of giving a response suitable for the aspect of at least one of the user and the device 200 is selected from a plurality of devices 200, it is possible to cause the device desirable to the user to give a response.

Further, the information processing device 100-1 instructs the selected device 200 to perform an operation related to the operation content specified on the basis of the voice information. Therefore, since the information processing device 100-1 directly gives an instruction to give a response to the selected device 200, it is possible to reduce the time lag from the utterance of the user to the response given by the device 200.

Further, the operation content is specified on the basis of the voice recognition using the voice information, and the operation related to the operation content includes a notification given to the user. Therefore, since the notification corresponding to the utterance content of the user is performed, it is easy for the user to understand the response to his/her utterance, and the convenience of the user can be improved.

Further, the specified aspect includes the state of the device 200. Thus, since the device 200 in the state suitable for giving a response is selected, the user is able to understand the response more easily.

Further, the device information includes at least one of the sensor information obtained from the sensor installed in the device 200 and the operation status information indicating the operation status of the device 200, and the information processing device 100-1 estimates the state of the device 200 using the device information. Therefore, since the state of the device 200 is more accurately estimated, it is possible to select the device 200 more suitable for giving a response.

The device information includes the operation function information indicating the operation function of the device 200, and the information processing device 100-1 selects the device 200 from a plurality of devices 200 on the basis of the first correspondence relation between the state of the device 200 and the operation function. Therefore, since the state of the device 200 is associated with an inappropriate or priority operation function or response method, a time necessary for narrowing down the response method suitable for the state of the device 200 is reduced. As a result, it is possible to reduce the time in which the user waits for a response.

Further, the information processing device 100-1 stores first correspondence relation information indicating the first correspondence relation, and the first correspondence relation information is set by the user. Therefore, since the device 200 corresponding to the intention of the user is selected, the convenience of the user can be improved.

Further, the specified aspect includes the aspect of the user. Therefore, since the device 200 suitable for the aspect of the user, that is, the user context is selected, the user is able to understand the response easily.

Further, the information processing device 100-1 estimates the aspect of the user on the basis of at least one of the voice information and the device information. Therefore, since the aspect of the user is more accurately estimated, it is possible to select the device 200 more suitable for giving a response.

Further, the device information includes the operation function information indicating the operation function of the device 200, and the information processing device 100-1 selects the device 200 from a plurality of devices 200 on the basis of the second correspondence relation between the aspect of the user and the priority information of the operation function. Therefore, since the user context is associated with a selection criteria for the response method, the time necessary for narrowing down the response method suitable for the user context is reduced. As a result, it is possible to reduce the time necessary for selecting the device 200.

Further, the information processing device 100-1 stores second correspondence relation information indicating the second correspondence relation, and the second correspondence relation information is set by the user. Therefore, since the device 200 corresponding to the intention of the user is selected, the convenience of the user can be improved.

2-3. Modified Examples

The first embodiment of the present disclosure has been described above. The present embodiment is not limited to the above example. First and second modified examples of the present embodiment will be described below.

First Modified Example

Figure 13:
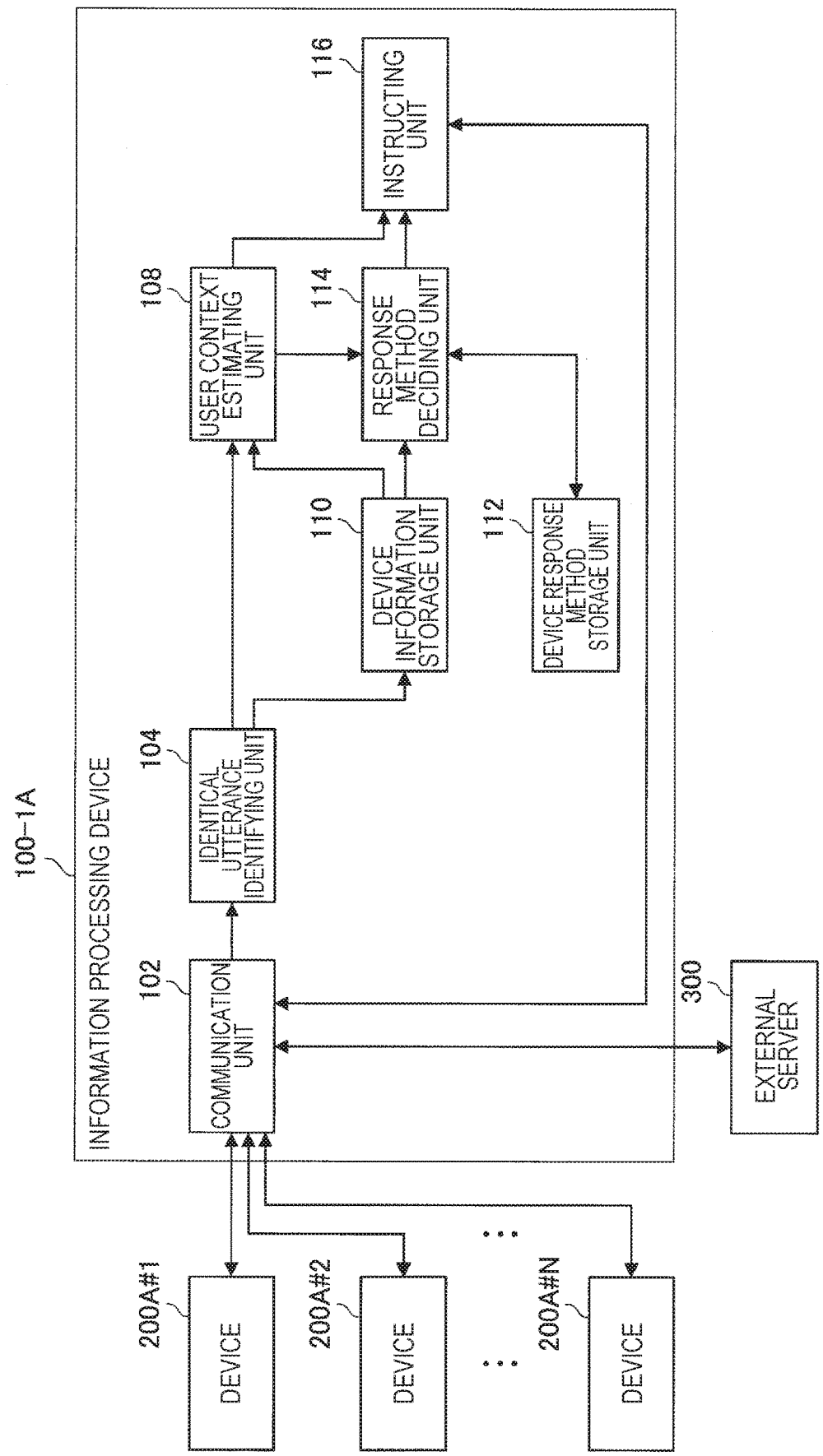
[FIG. 13]

In a first modified example of the present embodiment, some processes of the information processing device 100-1 may be performed externally. Specifically, the process of the voice recognizing unit 106 is performed outside the information processing device 100-1. Further, a functional configuration of the information processing device 100-1 in accordance with the present modified example will be described with reference to FIG. 13. FIG. 13 is a block diagram illustrating an example of a schematic functional configuration of an information processing system including an information processing device 100-1 in accordance with the first modified example of the present embodiment.

As illustrated in FIG. 13, an information processing device 100-1A according to the present modified example does not include the voice recognizing unit 106, but instead, a device outside the information processing device 100-1, for example, the device 200, performs substantially the same process as the process of the voice recognizing unit 106. In the information processing device 100-1A, the voice information including the voice recognition result is received by the communication unit 102, and the voice information is directly provided from the identical utterance identifying unit 104 to the user context estimating unit 108.

Figure 14:
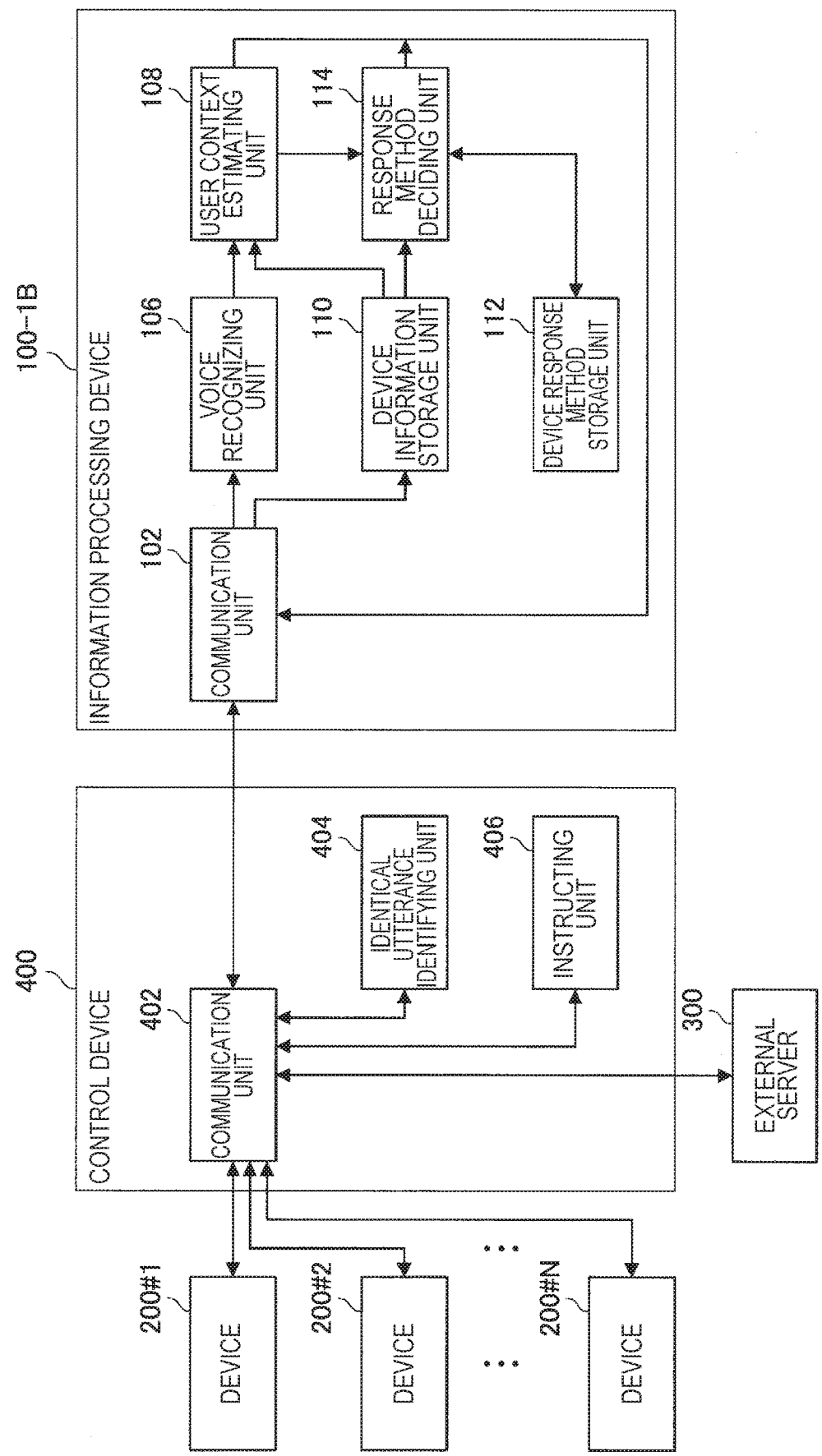
[FIG. 14]

Further, the process of the identical utterance identifying unit 104 and the process of the instructing unit 116 may be performed outside the information processing device 100-1. Another functional configuration of the information processing device 100-1 according to the present modified example will be described with reference to FIG. 14. FIG. 14 is a block diagram illustrating another example of a schematic functional configuration of the information processing system including the information processing device 100-1 in accordance with the first modified example of the present embodiment.

As illustrated in FIG. 14, another information processing device 100-1B according to the present modified example is not equipped with the identical utterance identifying unit 104 and the instructing unit 116, but instead, a control device 400 having an identical utterance identifying unit 404 and an instructing unit 406 is provided.

In the information processing device 100-1B, the voice information and the device information received from the communication unit 102 are directly provided to the voice recognizing unit 106 and the device information storage unit 110, respectively. Further, the processing results of the user context estimating unit 108 and the response method deciding unit 114 are provided to the control device 400 which is separately installed through the communication unit 102.

The control device 400 includes a communication unit 402, an identical utterance identifying unit 404, and an instructing unit 406. The communication unit 102 performs communication with the device 200, the information processing device 100-1B, and the external server 300. The identical utterance identifying unit 404 performs substantially the same process as the process of the identical utterance identifying unit 104. The instructing unit 406 performs substantially the same process as the process of the instructing unit 116.

Further, the process of estimating the state of the device 200 in the response method deciding unit 114 may be performed outside the information processing device 100-1. For example, instead of estimating the state of the device 200 by the response method deciding unit 114, a device outside the information processing device 100-1, for example, the device 200, estimates the state on the basis of the sensor information or the like of its own device. Then, the device information including information indicating the state of the device 200 is transmitted to the information processing device 100-1. The information indicating the status of the device 200 may be transmitted separately from the device information.

Thus, according to the first modified example of the present disclosure, some processes of the information processing device 100-1 are performed externally. Therefore, since the configuration of the information processing device 100-1 is simplified, it is possible to reduce the cost of the information processing device 100-1.

Second Modified Example

In a second modified example of the present embodiment, the information processing device 100-1 may cause another device 200 different from the selected device 200 to give a response instead of the selected device 200. Specifically, the response method deciding unit 114 selects an alternative device 200 in a case in which it is difficult to execute the operation related to the operation content which the selected device 200 is instructed to perform.

More specifically, in a case in which the selected device 200 is unable to perform the operation related to the instruction when the operation instruction is given, the response method deciding unit 114 selects the device 200 from the other devices 200 having the same response method as the device 200. For example, in a case in which the selected device 200 is instructed to perform the speaker output, when the speaker of the device 200 is broken, another device 200 having a speaker is selected. Further, it may be difficult to perform the operation even when the operation is unable to be performed or the operation instruction is unable to be received due to a decrease in the remaining battery level of the device 200, an increase in a processing load, or the like.

The example in which another device 200 having the same operation method as the device 200 which is unable to perform the operation is selected has been described above, but another device 200 having a different response method from the device 200 which is unable to perform the operation may be selected. For example, in a case in which the selected device 200 is instructed to perform the speaker output, when the speaker of the device 200 is broken, another device 200 having a display may be selected.

Then, content corresponding to the response content of the response method of the device 200 which is selected first is output from the device 200 which is selected later. For example, in a case in which the response method of the device 200 which is selected first is the speaker output, content output from the speaker, for example, a character string may be output from the display, or information related to content output from the speaker, for example, meta information for the voice information or the like may be output from the display.

As described above, according to the second modified example of the present disclosure, the information processing device 100-1 selects an alternative device 200 in a case in which it is difficult to execute the operation related to the operation content instructed to the selected device 200. Therefore, since the response from the device 200 is stopped, and the user is prevented from keeping waiting for the response, the convenience of the user can be improved.

3. Second Embodiment (Case in Which Two or More Devices Are Selected)

The information processing device 100-1 according to the first embodiment of the present disclosure has been described above. Next, an information processing device 100-2 in accordance with a second embodiment of the present disclosure will be described. In the second embodiment, the information processing device 100-2 gives an operation instruction so that a response is given by cooperation of a plurality of selected devices 200.

<3-1. Configuration of Device>

A functional configuration of the information processing device 100-2 according to the present embodiment is substantially the same as the functional configuration according to the first embodiment except that a function of the instructing unit 116 is different. Description of functions that are substantially the same as in the first embodiment will be omitted.

In a case in which a plurality of devices 200 are selected, the instructing unit 116 instructs each of the plurality of devices 200 to perform an operation. Specifically, in a case in which a plurality of devices 200 are selected, the instructing unit 116 instructs each of the selected devices 200 to perform an operation associated with each of the selected device 200. A process of the instructing unit 116 of the present embodiment will be described in detail with reference to FIGS. 15 and 16. FIG. 15 is a diagram illustrating an example of a device-response method table which is generated and updated by the information processing device 100-2 according to the present embodiment. FIG. 16 is a diagram illustrating an example of a device combination-response content table stored in the information processing device 100-2 according to the present embodiment.

First, the instructing unit 116 determines whether or not there are a plurality of devices 200 selected as the device 200 that gives a response. For example, a device-response method table 36 which is generated and updated by the response method deciding unit 114 is provided from the response method deciding unit 114 to the instructing unit 116. Then, on the basis of the device-response method table 36, the instructing unit 116 determines whether or not there are a plurality of device IDs, that is, a plurality of devices 200 in which the response method is set to the presence. For example, in a device-response method table 32 as illustrated in FIG. 15, there are two device IDs, that is, two devices 200 including SW-01 in which the display output is set to the presence and PS-01 in which the speaker output is set to the presence. Therefore, the instructing unit 116 determines that there are a plurality of selected devices 200.

In a case in which it is determined that there are a plurality of selected devices 200, the instructing unit 116 specifies response content corresponding to a combination of the selected devices 200. Specifically, the instructing unit 116 specifies instruction content on the basis of the correspondence relation between the combination of the selected device 200 and an operation associated with each of the selected devices 200.

For example, in the device-response method table 36 as illustrated in FIG. 15, since the selected response method indicates the display output of SW-01 and the speaker output of PS-01, the instructing unit 116 selects the response content in two rows from the top of a device combination-response content table 60 illustrated in FIG. 16 as candidates. Furthermore, in a case in which the type of content is music, the instructing unit 116 selects response content at the top of the device combination-response content table 60 as indicated by dots in FIG. 16.

Then, the instructing unit 116 instructs each of the devices 200 to perform an operation on the basis of the specified response content. For example, as indicated by dots in FIG. 16, the instructing unit 116 instructs the device 200 corresponding to PS-01 in which the speaker output is set to the presence to output music on the basis of the selected response content, and instructs the device 200 corresponding to SW-01 in which the display output is set to the presence to display the lyrics related to the music.

The device combination-response content table is stored in a storage unit which is separately installed in the information processing device 100-1. Further, the device combination-response content table may be set by the user. For example, addition, change or deletion of content of the table is performed.

<3-2. Device Process>

A process of the information processing device 100-2 according to the present embodiment is substantially the same as the process in the first embodiment except for the process of the instructing unit 116, and thus description thereof will be omitted.

Thus, according to the second embodiment of the present disclosure, in a case in which a plurality of devices 200 are selected, the information processing device 100-2 instructs each of the selected devices 200 to perform an operation associated with each of the selected device 200. Therefore, since a plurality of devices 200 give a response to the user, a variation in a response increases, and it is possible to give a response more desirable to the user.

Further, the information processing device 100-2 specifies the instruction content to the selected device 200, on the basis of a third correspondence relation between a combination of selected devices 200 and an associated operation. Therefore, since a combination of devices 200 is associated with the response content suitable for the combination of devices 200, a time necessary for deciding the response content is reduced. As a result, it is possible to reduce a time in which the user waits for a response.

3-3. Modified Examples

The second embodiment of the present disclosure has been described above. The present embodiment is not limited to the above example. First to third modified examples of the present embodiment will be described below.

First Modified Example

In a first modified example of the present embodiment, the information processing device 100-2 may narrow down the device 200 that gives a response in a case in which a plurality of devices 200 are selected. Specifically, in a case in which a plurality of devices 200 are selected, the response method deciding unit 114 narrows down the selected devices 200 on the basis of an input from the user.

More specifically, in a case in which a plurality of devices 200 are selected, the response method deciding unit 114 narrows down the devices 200 on the basis of the selection of the device 200 from a plurality of devices 200 selected through the response method deciding unit 114 by the user which serves as an input from the user. For example, in a case in which there are a plurality of device IDs in which the response method is set to the presence in the device-response method table, the response method deciding unit 114 causes the device 200 to perform an output for urging the user to select the device 200 via the communication unit 102. For example, as the device 200 which is caused to perform the output, the device 200 worn on the user or the device 200 around the user may be selected.

Further, the response method deciding unit 114 may narrow down the devices 200 on the basis of an answer of the user to a question given to the user which serves as an input from the user. For example, the response method deciding unit 114 narrows down the devices 200 that gives a response by having a conversation with the user using a voice agent operating on the information processing device 100-2. The voice agent may operate on an external device connected to the information processing device 100-2, and in this case, the response method deciding unit 114 controls an operation of the voice agent through communication and acquires an operation result.

The example in which the devices 200 are narrowed down on the basis of a conversion using a voice has been described above, but the devices 200 may be narrowed down on the basis of a conversion using a display.

Thus, according to the first modified example of the present disclosure, in a case in which a plurality of devices 200 are selected, the information processing device 100-2 narrows down the selected devices 200 on the basis of the input from the user. Therefore, since the response is given from the device 200 intended by the user, the convenience of the user can be improved.

Further, the input from the user includes the selection of the device 200 from a plurality of selected devices 200 by the user. Therefore, since a response is reliably given from the device 200 from which the user desires a response, the convenience of the user can be further improved.

Further, the input from the user includes the answer of the user to the question given to the user. Therefore, although the user does not know the device 200 since intention of the user is inferred on an interactive basis, it is possible to cause the device 200 corresponding to the intention of the user to give a response.

Second Modified Example

In a second modified example of the present embodiment, the information processing device 100-2 may narrow down the device 200 on the basis of the position of the device 200 in a case in which a plurality of devices 200 are selected. Specifically, in a case in which a plurality of devices 200 are selected, the response method deciding unit 114 narrows down the selected devices 200 on the basis of the position of each of the plurality of selected devices 200.

More specifically, the response method deciding unit 114 narrows down the devices 200 on the basis of a positional relation of the selected devices 200. For example, the response method deciding unit 114 selects the device 200 positioned near the center in an arrangement of each of the selected devices 200. In this case, since the devices 200 are narrowed down without using specific positions of the devices 200, the accuracy of information required for the narrowing-down process is reduced, and thus the processing load can be reduced.

Further, the response method deciding unit 114 may select the device 200 on the basis of a positional relation with another specific device 200 among the selected devices 200. For example, the response method deciding unit 114 selects the device 200 having the display output as the response method and the device 200 which is positioned within a predetermined distance range from the device 200 and has the speaker output as the response method. Accordingly, for example, a voice or the like is output from the back, the left or right side, or the like of the user viewing a video output to the display, and thus it is possible to give the user a realistic sensation. As described above, the devices 200 are narrowed down in accordance with a specific combination of devices 200, and thus it is possible to give a response to the user more effectively. The method of selecting the specific combination may be set in the information processing device 100-2 in advance or may be set and changed by the user.

Further, the response method deciding unit 114 may narrow down the devices 200 on the basis of a relation between the position of each selected device 200 and the position of the user. For example, the response method deciding unit 114 sequentially selects the device 200 close to the position of the user. In this case, the user easily understands the response, and it is possible to improve a degree of satisfaction of the user.

Further, the response method deciding unit 114 may narrow down the devices 200 in accordance with a density of the devices 200. For example, the response method deciding unit 114 performs a setting so that the device 200 which is high in the density of the devices 200, that is, the device 200 having a shorter distance to the devices 200 is more likely to be selected. In this case, for example, in a case in which the user desires to cause the dense device 200 not to perform an operation or in a case in which the user desires to cause the dense device 200 to perform an operation, the device 200 according to the intention of the user is likely to give a response, and it is possible to improve the degree of satisfaction of the user.

Further, the response method deciding unit 114 may narrow down the devices 200 depending on whether the position of the device 200 is a predetermined position. For example, in a case in which the device 200 is positioned in a room, the response method deciding unit 114 causes the device 200 to be likely to be selected. In this case, it is possible to narrow down the devices 200 without considering the positional relation with other devices 200.

The position of the device 200 may be input by the user or may be estimated by the device 200. For example, the position of the device 200 may be estimated on the basis of information attenuating as a distance increases, for example, intensity information of radio waves, sound waves, ultrasonic waves, or the like. Further, the position of the device 200 may be estimated from an image obtained by imaging of an imaging device such as a camera installed in a space in which the device 200 is installed. Further, the position of the device 200 may be estimated on the basis of a distance obtained from a phase difference of waves such as radio waves, sound waves, or ultrasonic waves.

As described above, according to the second modified example of the present disclosure, in a case in which a plurality of devices 200 are selected, the information processing device 100-2 narrows down the selected devices 200 on the basis of the position of each of a plurality of selected devices 200. Thereafter, since the device 200 giving a response is narrowed down to the device 200 existing at a position more suitable for giving a response, the user is able to more easily understand the response, and it is possible to improve the degree of satisfaction of the user.

Third Modified Example

In a third modified example of the present embodiment, the device 200 may have a plurality of response methods of the same type. Specifically, in a case in which the device 200 has one or more response methods of the same type, the device response method storage unit 112 stores each of the response methods of the same type as an independent response method. Further, a response method presence/absence table according to the present modified example will be described with reference to FIG. 17. FIG. 17 is a diagram illustrating an example of the response method presence/absence table of the device 200 stored in the information processing device 100-2 according to the second modified example of the present embodiment.

In a case in which the device 200 has a plurality of response methods of the same type, fields corresponding to a plurality of response methods are provided in the response method presence/absence table. For example, in a case in which the device 200 has a plurality of display outputs, a response method presence/absence table 22 is provided with fields corresponding to display outputs such as a display output 1 and a display output 2 as illustrated in FIG. 17.

The example in which each of the response methods of the same type is independently dealt with has been described above, but a plurality of response methods of the same type may be dealt with as one response method. For example, surround outputs implemented by a plurality of speaker outputs may be dealt with as one response method.

As described above, according to the third modified example of the present disclosure, the device 200 has a plurality of response methods of the same type. Therefore, since a response in which a plurality of response methods of the same type are combined is given, it is possible to give a more favorable response to the user.

<4. Hardware Configuration of Information Processing Apparatus According to Embodiment of Present Disclosure>

Hereinabove, the information processing apparatus 100 according to each of the embodiments according to the present disclosure has been described. The processing of the information processing apparatus 100 described above is realized by cooperation between software and hardware of the information processing apparatus 100 described below.

Figure 18:
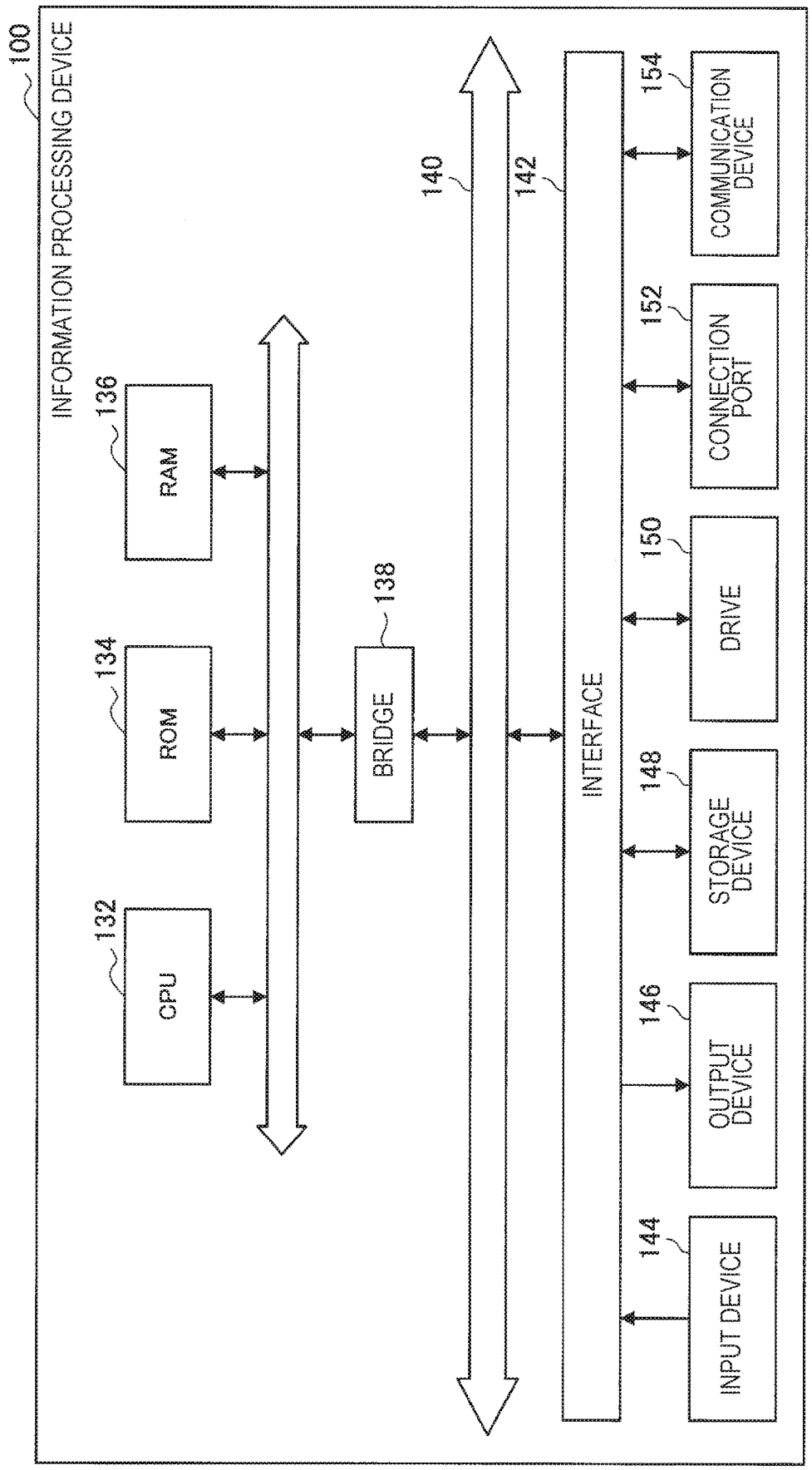
[FIG. 18]

FIG. 18 is an explanatory view showing a hardware configuration of the information processing apparatus 100 according to an embodiment of the present disclosure. As shown in FIG. 18, the information processing apparatus 100 includes a central processing unit (CPU) 132, a read only memory (ROM) 134, a random access memory (RAM) 136, a bridge 138, a bus 140, an interface 142, an input device 144, an output device 146, a storage device 148, a drive 150, a connection port 152, and a communication device 154.

The CPU 132 functions as an operation processing device and implements the operations of the identical utterance identifying unit 104, the voice recognizing unit 106, the user context estimating unit 108, the response method deciding unit 114, and the instructing unit 116 in the information processing device 100 in cooperation with various kinds of programs. The CPU 132 may be a microprocessor. The ROM 134 stores programs, operation parameters, or the like to be used by the CPU 132. The RAM 136 temporarily stores programs for use in execution of the CPU 132, parameters that change as appropriate in the execution, and the like. A part of the device information storage unit 110 and a part of the device response method storage unit 112 in the information processing device 100 are implemented by the ROM 134 and the RAM 136. The CPU 132, the ROM 134, and the RAM 136 are connected to one another via an internal bus constituted of a CPU bus or the like.

The input device 144 includes, for example, input means for allowing a user to input information, such as a mouse, a keyboard, a touch panel, a button, a microphone, a switch, and a lever, and an input control circuit for generating an input signal on the basis of input by the user and outputting the signal to the CPU 132. The user of the information processing apparatus 100 can operate the input device 144 to input various types of data to the information processing apparatus 100 or instruct the information processing apparatus 100 to perform processing operation.

The output device 146 performs, for example, output operation on a device, such as a liquid crystal display (LCD) device, an organic light emitting diode (OLED) device, or a lamp. Further, the output device 146 may include a loudspeaker and a headphone for outputting sound.

The storage device 148 is a device for storing data. The storage device 148 may include a storage medium, a recording device for recording data on the storage medium, a reading device for reading the data from the storage medium, a deleting device for deleting the data recorded on the storage medium, and the like. The storage device 148 stores programs executed by the CPU 132 and various types of data.

The drive 150 is a reader-writer for a storage medium and is provided inside or externally attached to the information processing apparatus 100. The drive 150 reads information recorded on a removable storage medium that is attached thereto, such as a magnetic disk, an optical disk, a magneto-optical disk, or a semiconductor memory, and then outputs the information to the RAM 134. The drive 150 can also write information to the removable storage medium.

The connection port 152 is a bus to be connected to, for example, an information processing device or peripheral device provided outside the information processing apparatus 100. The connection port 152 may be a universal serial bus (USB).

The communication device 154 is, for example, as an example of the communication unit 102 of the information processing apparatus 100, a communication interface constituted of a communication device to be connected to a network. The communication device 154 may be a wireless local area network (LAN) compatible communication device, a Long Term Evolution (LTE) compatible communication device, or a wired communication device for performing wired communication.

5. CONCLUSION

According to the first embodiment of the present disclosure, the device 200 capable of giving a response suitable for an aspect of at least one of the user and the device 200 is selected from a plurality of devices 200, and thus it is possible to cause the device desirable to the user to give a response.

According to the second embodiment of the present disclosure, a plurality of devices 200 gives a response to the user, and thus the variation in the response increases, and it is possible to give a response more desirable to the user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiments, the correspondence relation between the device state and the inappropriate response method, the correspondence relation between the user context and the priority response method, and the like are managed in the table form, but the present technology is not limited to these examples. For example, the correspondence relation and the like may be managed in other data forms such as an array, a list, or a stack.

In the above embodiments, the example in which the response method is a response method based on a physical configuration has been described, but the response method may be a response method based on a logical or virtual configuration. For example, the display or the speaker has been described as the physical configuration, but a configuration implemented by software such as a window or a widget in a computer, a television, or the like may be used as the logical configuration. Further, the response method based on the physical configuration and the response method based on the logical configuration may be dealt with as different types or may be dealt with as the same type. For example, the display output and the window output may be dealt with as the same type.

In the above embodiments, the example in which the device 200 includes the sound collecting unit has been described, but only some of the devices 200 belonging to one group may be provided with it. Further, a device including a sound collecting unit without having a response method may be installed in a space in which the device 200 belonging to one group is installed. In this case, the information processing device 100 obtains the voice information from the device.

Further, in the above embodiments, the example in which the instruction operation of the information processing device 100 is a notification given to the user has been described, but the instruction operation may be any other operation of the device 200. For example, the instruction operation may be an indirect response operation such as switching of electric power, start and stop of an operation of an air conditioner or the like, switching of lighting, or unlocking. Further, the instruction operation may be an internal operation of a device that is difficult for the user to sense such as recording of information, downloading or of uploading information, or activation of software.

In the above embodiments, in a case in which a plurality of devices 200 are selected, the example in which the devices 200 are narrowed down on the basis of the priority information, the input from the user, or the position of the device 200, but any other narrowing method may be used. For example, the device 200 whose device ID is positioned at a higher position in the device-response method table may be selected.

Further, the information processing device 100 according to the above embodiments can be also used for searching for the device 200. For example, in a case in which the user is looking for a smartphone, when the user murmurs "Where is my smartphone?," the information processing device 100 instruct the smartphone to perform an operation such as the speaker output if the smartphone is near the user, for example, within a predetermined distance from the user. As a result, the user who notices a sound output from the speaker is able to find the smartphone. Further, in a case in which the smartphone is not near the user, the information processing device 100 may cause other devices 200 positioned near the user to notify of the position of the smartphone.

Further, the processes according to the above embodiments and the modified examples may be recombined or combined. For example, the information processing device 100 may include both the functional configuration according to the first embodiment and the functional configuration according to the second embodiment and may support both the case in which one device 200 is selected and the case in which a plurality of devices 200 are selected.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing device including:

an input unit configured to obtain information related to a voice of a user and device information of each of a plurality of devices; and a selecting unit configured to select a device from the plurality of devices on the basis of an aspect specified by at least one of the information related to the voice and the device information obtained by the input unit and the device information.

(2)

The information processing device according to (1), further including:

an operation instructing unit configured to instruct the device selected by the selecting unit to perform an operation related to operation content specified on the basis of the information related to the voice.

(3)

The information processing device according to (2), in which the operation content is specified on the basis of voice recognition using the information related to the voice, and the operation related to the operation content includes a notification given to the user.

(4)

The information processing device according to (2) or (3), in which the specified aspect includes a state of the device.

(5)

The information processing device according to (4), in which the device information includes at least one of sensor information obtained from a sensor installed in the device and operation status information indicating an operation status of the device, and the information processing device further includes a first estimating unit configured to estimate a state of the device using the device information.

(6)

The information processing device according to (4) or (5), in which the device information includes operation function information indicating an operation function of the device, and the selecting unit selects a device from the plurality of devices on the basis of a first correspondence relation between the state of the device and the operation function.

(7)

The information processing device according to (6), further including:

a storage unit configured to store first correspondence relation information indicating the first correspondence relation, in which the first correspondence relation information is set by the user.

(8)

The information processing device according to any one of (2) to (7), in which the specified aspect includes an aspect of the user.

(9)

The information processing device according to (8), further including:

a second estimating unit configured to estimate the aspect of the user on the basis of at least one of the information related to the voice and the device information.

(10)

The information processing device according to (8) or (9), in which the device information includes operation function information indicating an operation function of the device, and the selecting unit selects a device from the plurality of devices on the basis of a second correspondence relation between the aspect of the user and priority information of the operation function.

(11)

The information processing device according to (10), further including:

a storage unit configured to store second correspondence relation information indicating the second correspondence relation, in which the second correspondence relation information is set by the user.

(12)

The information processing device according to any one of (2) to (11), in which, in a case in which a plurality of devices are selected, the operation instructing unit instructs each of the selected devices to perform an operation associated with each of the selected devices.

(13)

The information processing device according to (12), in which the operation instructing unit specifies instruction content for the selected device on the basis of a third correspondence relation between a combination of the selected devices and the associated operation.

(14)

The information processing device according to any one of (2) to (13), in which, in a case in which a plurality of devices are selected, the selecting unit narrows down the selected devices on the basis of an input from the user.

(15)

The information processing device according to (14), in which the input from the user includes selection of a device from the plurality of devices selected through the selecting unit by the user.

(16)

The information processing device according to (14) or (15), in which the input from the user includes an answer of the user to a question given to the user.

(17)

The information processing device according to any one of (2) to (16), in which, in a case in which a plurality of devices are selected, the selecting unit narrow down the selected devices on the basis of the position of each of the plurality of devices selected by the selecting unit.

(18)

The information processing device according to any one of (2) to (17), in which, in a case in which it is difficult for the selected device to perform the operation related to the operation content, the selecting unit selects an alternative device.

(19)

An information processing method including:

obtaining, by an input unit, information related to a voice of a user and device information of each of a plurality of devices; and selecting a device from the plurality of devices on the basis of an aspect specified by at least one of the information related to the voice and the device information obtained by the input unit and the device information.

(20)

A program causing a computer to implement:

an input function configured to obtain information related to a voice of a user and device information of each of a plurality of devices; and a selecting function configured to select a device from the plurality of devices on the basis of an aspect specified by at least one of the information related to the voice and the device information obtained by the input function and the device information.

REFERENCE SIGNS LIST

100 information processing device
102 communication unit 104 identical utterance identifying unit
106 voice recognizing unit
108 user context estimating unit
110 device information storage unit
112 device response method storage unit
114 response method deciding unit
116 instructing unit
200 device
300 external server
400 control device

The invention claimed is:

1. An information processing device, comprising:
a circuitry configured to:
obtain voice information associated with a user's voice, device information of each device of a plurality of devices, and response method information that indicates a response method associated with each device of the plurality of devices;
generate a table based on the response method information, wherein the table indicates a correspondence between each device of the plurality of devices and one of presence or absence of the response method;
modify information related to the one of the presence or the absence of the response method for at least one device of the plurality of devices based on
a priority of the response method based on user context;
select a first plurality of devices from the plurality of devices based on the modified information and an aspect specified by combination of a position of each device of the first plurality of devices and at least one of the voice information or the device information;
determine response content that includes a combination of response methods based on a correspondence relationship between a combination of the selected first plurality of devices and an operation associated with each device of the first plurality of devices; and
control the first plurality of devices to execute respective operations by the combination of response methods based on the determined response content, wherein the response content is specified based on the voice information.

2. The information processing device according to claim 1, wherein the response content is specified based on voice recognition using the voice information, and
the operation includes a notification to a user.

3. The information processing device according to claim 1, wherein the specified aspect includes a state of each device of the first plurality of devices.

4. The information processing device according to claim 3, wherein
the device information includes at least one of sensor information obtained from a sensor in each device of the plurality of devices and operation status information indicating an operation status of each device of the plurality of devices and
the circuitry is further configured to determine the state each device of the plurality of devices based on the device information.

5. The information processing device according to claim 3, wherein
the device information includes operation function information indicating an operation function of each device of the plurality of devices and
the first plurality of devices is selected based on a correspondence relation between the state of each device of the first plurality of devices and the operation function.

6. The information processing device according to claim 5, wherein
the circuitry is further configured to store, in a storage device, correspondence relation information indicating the correspondence relation, and
the correspondence relation information is set by user input.

7. The information processing device according to claim 1, wherein the specified aspect includes a user's aspect.

8. The information processing device according to claim 7, wherein the circuitry is further configured to
estimate the user's aspect based on at least one of the voice information or the device information.

9. The information processing device according to claim 7, wherein
the device information includes operation function information indicating an operation function of each device of the plurality of devices and
the first plurality of devices is selected based on a correspondence relation between the user's aspect and priority information of the operation function.

10. The information processing device according to claim 9, wherein
the circuitry is further configured to store, in a storage device, correspondence relation information indicating the correspondence relation,
the correspondence relation information is set by user input.

11. The information processing device according to claim 1, wherein the circuitry is further configured to
specify instruction content for each device of the first plurality of devices based on the correspondence relationship between the combination of the first plurality of devices and the operation.

12. The information processing device according to claim 1, wherein
the circuitry is further configured to narrow down, based on selection of the first plurality of devices from the plurality of devices, the first plurality of devices and
the first plurality of devices is narrowed down based on a user input.

13. The information processing device according to claim 12, wherein the user input includes selection of the first plurality of devices from the plurality of devices.

14. The information processing device according to claim 12, wherein the user input includes an answer of a user to a question.

15. The information processing device according to claim 1, wherein
the circuitry is further configured to narrow down, based on selection of the first plurality of devices from the plurality of devices, the first plurality of devices, and
the first plurality of devices is narrowed down based on position of each device of the first plurality of devices.

16. The information processing device according to claim 1, wherein the circuitry is further configured to select an alternative device based on determination of a difficulty level to execute the operation.

17. The information processing device according to claim 1, wherein
the user context is associated with a user request, and
the priority of the response method is based on a performance of the plurality of devices with respect to the user request.

18. The information processing device according to claim 1, wherein the circuitry is further configured to:

control a first device of the first plurality of devices to output sound related to music content based on the determined response content; and control a second device of the first plurality of devices to display lyrics related to the music content based on the determined response content.

19. An information processing method, comprising:
obtaining, by a circuitry, voice information associated with a user's voice, device information of each device of a plurality of devices, and response method information that indicates a response method associated with each device of the plurality of devices;
generating a table based on the response method information, wherein the table indicates a correspondence between each device of the plurality of devices and one of presence or absence of the response method;
modifying information related to the one of the presence or the absence of the response method for at least one device of the plurality of devices based on
  a priority of the response method based on user context;
selecting a first plurality of devices from the plurality of devices based on the modified information and an aspect specified by combination of position of each device of the first plurality of devices and at least one of the voice information or the device information;
determining response content that includes a combination of response methods based on a correspondence relationship between a combination of the selected first plurality of devices and an operation associated with each device of the first plurality of devices; and
controlling the first plurality of devices to execute respective operations by the combination of response methods based on the determined response content, wherein the response content is specified based on the voice information.

20. A non-transitory computer-readable medium, having stored thereon computer-readable instructions, which when executed by a computer, cause the computer to execute operations, the operations comprising:
obtaining voice information associated with a user's voice, device information of each device of a plurality of devices, and response method information that indicates a response method associated with each device of the plurality of devices;
generating a table based on the response method information, wherein the table indicates a correspondence between each device of the plurality of devices and one of presence or absence of the response method;
modifying information related to the one of the presence or the absence of the response method for at least one device of the plurality of devices based on
  a priority of the response method based on user context;
selecting a first plurality of devices from the plurality of devices based on the modified information and an aspect specified by combination of position of each device of the first plurality of devices and at least one of the voice information or the device information;
determining response content that includes a combination of response methods based on a correspondence relationship between a combination of the selected first plurality of devices and an operation associated with each device of the first plurality of devices; and
controlling of the first plurality of devices to execute respective operations by the combination of response methods based on the determined response content, wherein the response content is specified based on the voice information.

* * * * *